United States Patent Office 3,027,804
Patented Apr. 3, 1962

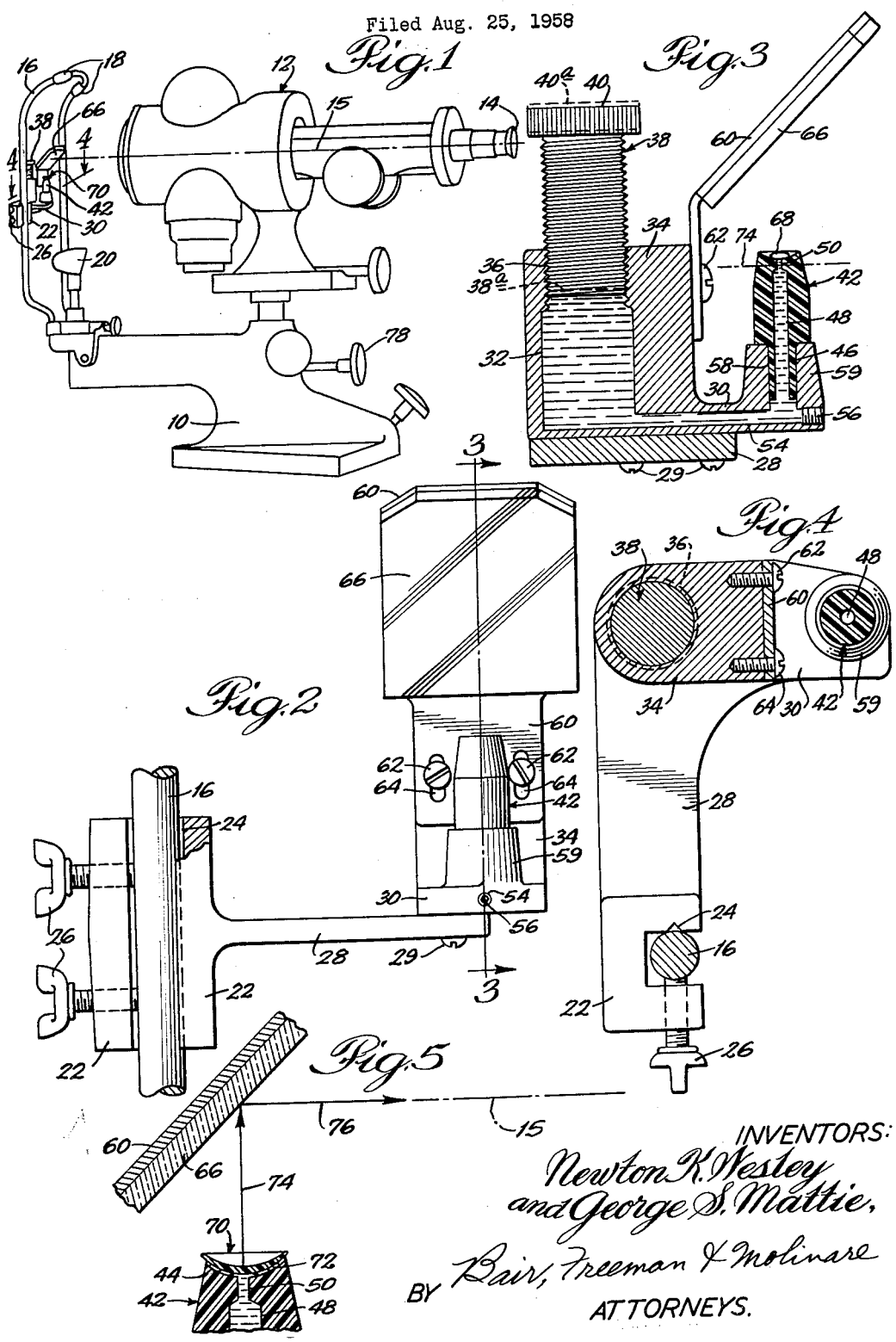

3,027,804
CONTACT LENS SUPPORT
Newton K. Wesley, Chicago, and George S. Mattie, Palatine, Ill., assignors to Plasmatic, Inc., Des Plaines, Ill., a corporation of Illinois
Filed Aug. 25, 1958, Ser. No. 756,992
2 Claims. (Cl. 88—56)

This invention relates to a support for a contact lens (such as one of the corneal type shown in the copending application of Newton K. Wesley, Serial No. 701,153, filed December 6, 1957), while measuring the inside curvature thereof.

One object of our invention is to provide a convenient and readily operable means for supporting the contact lens in position for measuring its curvature with an optical instrument (such as a keratometer or ophthalmometer) without the holding means causing distortion of the surface of the lens in any manner such that aberrations would be temporarily present and result in inaccurate readings of the curvature.

Heretofore, lens supports for this purpose have been provided of the type having a concave seat for the lens, and the axis of the seat was horizontal so as to be aligned with the axis of the lens system in the keratometer or ophthalmometer. Various materials have been used to hold the lens to the concave seat such as clay, tooth paste, water, etc., but each material when used with the prior art supports has undesirable shortcomings. Clay is too viscous and therefore so stiff that it can warp the lens when the lens is pressed against the clay since the lenses are made of plastic material such as methyl methacrylate and are usually quite thin and therefore rather easy to bend out of shape. This introduces aberrations in the lens surface that result in inaccurate readings on the optical instrument when checking the curvature of the lens by focusing the mires of the instrument on the lens surface.

Tooth paste, while less viscous so as not to distort the lens, tends to harden if not cleaned off thoroughly after use, and this material is difficult to clean properly from the concave seat of the support. A drop of water on the concave seat of the support, when the seat has a horizontal axis, holds the lens in position by surface adhesion when the convex side of the lens is placed thereagainst, but due to the force of gravity the water film is thicker near the bottom of the seat than at the top, thus throwing the axis of the lens out of alignment with the lens system of the instrument, and in many cases, particularly if the lens is relatively thick and therefore heavy, it will slide off the film of water and drop away from the lens support. Also, there is the problem of water supply, either from a faucet (which is seldom provided near the instrument) or from an adjacent bottle or the like, which is also inconvenient as it must be kept corked to avoid undesirable evaporation, thus necessitating the uncorking and recorking of the bottle each time a film of water is required for supporting a lens for curvature checking thereof.

To overcome the shortcomings of the prior supporting methods above described, another object of our invention is to provide a novel type of support which has a concave lens seat arranged with its axis vertical instead of horizontal so that gravity acts on the lens to both seat it and center it in the concave seat of the support after the lens seat has been provided with a drop of water, water or other liquids being entirely satisfactory for holding the lens to the seat when the seat axis is vertical.

Still another object is to eliminate the inconvenience of having to place a drop of water on the lens seat each time it is desirable to use it to hold a lens for checking, which operation is performed at more-or-less infrequent intervals, between which intervals the water on the seat evaporates into the atmosphere.

A further object is to provide a novel construction of lens support with provision for containing a supply of water to furnish a drop of water to the lens seat thereof as desired.

Still a further object is to provide such means in the form of a reservoir in hydraulic communication with the lens seat, and readily and conveniently operable means to transfer at will a predetermined quantity of water from the reservoir to the lens seat.

More particularly it is our object to provide a reservoir in communication with the lens seat and having a manually and selectively operable water displacing means associated therewith so that water can be displaced into the seat and form therein a drop of the desired size sufficient for adhesion of the lens to the seat.

An additional object is to provide means for reflecting the image of the lens at right angles to the axis of the lens seat (such as by a mirror, prism or the like) thereby aligning such image with the horizontal axis of the instrument.

Another additional object is to provide means for readily mounting our lens support on the head supporting frame of the keratometer or ophthalmometer.

With these and other objects in view, our invention consists in the construction, arrangement and combination of the various parts of our contact lens supporting device, whereby the objects above contemplated are attained, as hereinafter more fully set forth, pointed out in our claims and illustrated in detail on the accompanying drawings, wherein:

FIG. 1 is a perspective view of a keratometer with our lens support mounted thereon for checking the curvature of a contact lens supported thereby;

FIG. 2 is an enlarged elevation of our lens support looking toward the mirror of the support in the same direction viewed through the keratometer;

FIG. 3 is a vertical sectional view through our lens support as taken on the line 3—3 of FIG. 2;

FIG. 4 is a horizontal sectional view thereof on the line 4—4 of FIG. 1; and

FIG. 5 is a fragmentary sectional view similar to FIG. 3 except on an enlarged scale to show the operation of our lens support.

On the accompanying drawing we have used the reference numeral 10 to indicate the base of a keratometer or similar instrument and 12 (in general) the optical head thereof, the eye piece of the lens system being shown at 14. The base 10 is usually provided with a head rest frame 16 having a pair of forehead engaging pads 18, and with a chin rest 20, for locating the patient's head with respect to the instrument 12 so as to examine the patient's eyes through the eye piece 14 and the lens system of the head 12 along the indicated horizontal axis and line of sight 15. The instrument 12 is provided with readily operable means for measuring the curvature of the cornea in either diopters, millimeters of radius or both. The instrument can likewise be used for measuring the concave curvature or "base" curves of lenses, if the lens is suitably supported in relation to the axis 15.

Our lens supporting device is provided for such support of the lens and comprises a channel member 22 having a V groove 24 and a pair of clamp screws 26 to coact with one of the rods of the head supporting frame 16 in the manner shown in FIGS. 1, 2 and 4. The channel 22 has a supporting arm 28 extending laterally therefrom.

A base 30 is supported on the arm 28 as by screws 29 and has a reservoir 32 in a vertically extending boss 34 of the base as disclosed in FIG. 2. The reservoir 32 is formed by a cavity in the boss adjacent the top of which are screw threads 36 to receive a displacement plug 38. The plug 38 is screw-threaded with respect to the threads 36 as shown and terminates at its upper end in a knurled head 40 for manual manipulation thereof. The base 30 with the reservoir 32 and the boss 34 may be formed of suitable metal such as aluminum alloy, and the plug 38 may be made of plastic material or the like.

A lens support 42 (which may also be made of plastic material) is provided having a concave lens seat 44 and a reduced extension or shank 46 entering a bore 58 therefor in a second vertical boss 59 of the base 30. The shank 46 may be a snug friction fit in the bore 58 as we have found a connection of this character does not leak water, a threaded connection being unnecessary. The lens support 42 has a bore 48 throughout the major portion of its height and this terminates in a relatively small port 50 hydraulically connecting the bore 48 to the concave seat 44. The reservoir 32 is in communication with the bore 58 through a passageway 54 drilled in the base 30 and plugged at 56.

A mirror support 60 is provided which may be attached to the reservoir 32 by a pair of clamping screws 62. These may extend through slots 64 of the mirror support 60 for vertical adjustment of the mirror support if desired. A mirror 66 (preferably a first surface mirror) is cemented or otherwise suitably secured to the mirror support 60.

The mirror 66 (see FIG. 5) reflects vertical rays of light from a lens 70 on the lens support 42 at substantially right angles along a horizontal axis 76 coincident with the instrument axis 15 as diagrammed in this figure.

*Practical Operation*

In the operation of our contact lens support and assuming the position of parts shown by solid lines in FIG. 3, a drop of water of approximately the size shown at 68 is sufficient to form a film of water 72 as shown in FIG. 5 when the contact lens 70 is placed thereon. The surface adhesion in the film of water 72 adequately holds the lens 70 in position, and since the lens axis is vertical, the lens under the force of gravity tends to center on the seat as shown. The axis of observation 15 is preferably adjusted so that the ray of light 74 coming up through the center or axis of the support 42 is centered in the eye piece 14. The instrument itself has an adjustment 78 for this purpose, and additionally our lens support of course may be clamped in any desired vertical position on the head supporting frame 16 by use of the clamp screws 26. Also, the adjustment of the mirror 66 can be changed relative to the lens support 42 by manipulation of the screws 62 in an obvious manner.

The instrument 12 is used to read either the upper (concave) curvature of the lens 70 or the lower (convex) curvature thereof by focusing the mires of the instrument on the desired surface of the lens. The film of water 72 is an aid in focusing on the upper concave curvature of the lens as it eliminates reflections from the lower surface of the lens.

After one lens is checked, and if it is some time before another one is checked, the drop of water 68 will soon evaporate but the rate of evaporation will be retarded by the relatively small hole 50 so that the level may recede only slightly therein as to the level 74 indicated in FIG. 3. Assuming that the plug 38 was at the dotted position 38ᵃ–40ᵃ shown in FIG. 2 when the level of the water was at 74, then a slight rotation of the plug to lower it to the position shown by full lines will displace sufficient water from the reservoir 32 to provide the drop indicated at 68.

From the foregoing description it will be obvious that we have provided a water supply for the lens support 42 of sufficient capacity to provide successive water drops at 68 thus eliminating the inconvenience of keeping a supply of water near the lens support or going to a faucet each time a drop of water is required for adhering a lens to the support. The reservoir 32 is of such size that in most cases the water therein will last a week or two thus requiring relatively infrequent refilling. Also, the plug 38 serves as an indicator for the quantity of water left in the reservoir 32, the near approach of the knurled head 40 to the top of the boss 34 indicating exhaustion of the supply whereupon the plug may be removed and the reservoir refilled to approximately the level shown in FIG. 3.

Some changes may be made in the construction and arrangement of the parts of our contact lens support without departing from the real spirit and purpose of our invention. It is our intention, therefore, to cover by our claims any modified forms of structure or use of mechanical equivalents which may reasonably be included within their scope.

We claim as our invention:

1. Means for supporting a contact lens on a keratometer having a horizontal lens system whereby the curvature of the lens surface may be measured by the keratometer comprising a supporting bracket having a seat for the lens with the lens axis vertical to prevent distortion of the lens, said seat being provided with a port, means for attaching said bracket to the keratometer, a liquid passage leading to said port of said lens seat, a reservoir hydraulically connected with said liquid passage, liquid displacing means for liquid from said reservoir through said port to said seat for forming a liquid film on a surface of said seat to support the contact lens adjacent said surface by surface adhesion, said liquid displacing means comprising a plug adjustably entering said reservoir to displace liquid therefrom as said plug enters said reservoir, said plug being screw-threadedly mounted in a wall of said reservoir whereby rotation of the plug enters the same to varying degrees into said reservoir and indicates the quantity of liquid therein by the position of said plug relative to said wall of said reservoir, and means vertically above said lens seat for reflecting the image of a lens supported thereon along a horizontal axis corresponding with the axis of the lens system of the keratometer.

2. Means for supporting a contact lens on a keratometer having a horizontal lens system whereby the curvature of the lens surface may be measured by the keratometer comprising a supporting bracket having a seat for the lens with the lens axis vertical to prevent distortion of the lens, said seat being provided with a port, means for attaching said bracket to the keratometer, a liquid passage leading to said port of said lens seat, a reservoir hydraulically connected with said liquid passage, liquid displacing means for liquid from said reservoir through said port to said seat for forming a liquid film on a surface of said seat to support the contact lens adjacent said surface by surface adhesion, said liquid displacing means comprising a plug adjustably entering said reservoir to displace liquid therefrom as said plug enters said reservoir, and reflecting means in the path of such vertical lens axis to reflect the image of said lens horizontally with the reflected image optically aligned with said horizontal lens system of the keratometer.

References Cited in the file of this patent

UNITED STATES PATENTS

| | | |
|---|---|---|
| 1,305,980 | Henker | June 3, 1919 |
| 2,300,251 | Flint | Oct. 27, 1942 |
| 2,370,389 | Bessin et al. | Feb. 27, 1945 |
| 2,418,786 | Nadig et al. | Apr. 8, 1947 |
| 2,437,436 | Mullen | Mar. 9, 1948 |

FOREIGN PATENTS

| | | |
|---|---|---|
| 1,110,349 | France | Oct. 12, 1955 |

(Other references on following page)

OTHER REFERENCES

Contact Lenses, Obrig et al. text (3rd ed., 1957), published by Obrig Laboratories, Inc., New York, N.Y., printed by The Chilton Co., Philadelphia, Pa., page 395 solely relied on.

"Contact Lens Fitting Manual," Wesley et al., Seventh Revision 1957, 30 pages, pp. 26 and 27 cited.

"A Microlens Measuring Aid," Laycock, article in the "American Journal of Optometry and Archives of American Academy of Optometry," vol. 34, No. 10, October 1957, pp. 538 and 539 cited.